US000001874H

United States Statutory Invention Registration [19]

[11] Reg. Number: H1,874

DeSantis

[45] Published: Oct. 3, 2000

[54] CHAIR FOR USE IN A CLEAN ROOM ENVIRONMENT

[75] Inventor: Gennaro Nicholas DeSantis, Woodland, Wash.

[73] Assignee: SEH America, Inc., Vancouver, Wash.

[21] Appl. No.: 09/100,381

[22] Filed: Jun. 19, 1998

[51] Int. Cl.[7] ..... A47C 3/00

[52] U.S. Cl. ..... 297/452.58; 297/452.61

[56] References Cited

U.S. PATENT DOCUMENTS

| | | | |
|---|---|---|---|
| 3,982,785 | 9/1976 | Ambasz | 297/337 X |
| 4,690,859 | 9/1987 | Porter et al. | 428/251 |
| 4,746,565 | 5/1988 | Bafford et al. | 428/251 |
| 4,757,968 | 7/1988 | Kinanen et al. | 297/348 X |
| 4,779,921 | 10/1988 | Holmstrom | 297/328 X |
| 4,806,185 | 2/1989 | Porter et al. | 156/78 |
| 5,090,770 | 2/1992 | Heinrichs et al. | 297/347 |
| 5,131,718 | 7/1992 | Cooper | 297/344 |
| 5,190,349 | 3/1993 | Austin, Jr. et al. | 297/316 |
| 5,369,805 | 12/1994 | Bergsten et al. | 297/411.35 |
| 5,433,409 | 7/1995 | Knopp | 297/344.19 |
| 5,711,575 | 1/1998 | Hand et al. | 297/284.6 |
| 5,791,733 | 8/1998 | van Hekken et al. | 297/284.4 |

*Primary Examiner*—Harold J. Tudor
*Attorney, Agent, or Firm*—Bell Seltzer Intellectual Property Law Group of Alston & Bird LLP

[57] ABSTRACT

A chair is provided that is specifically designed for use in a clean room environment by limiting the emission of particles by the chair as clean room personnel alternately sit down and stand up. The chair includes a base and a seat member operably mounted upon the base. The seat member, in turn, includes a cushion and a shell encapsulating the cushion. The shell is comprised of polytetrafluoroethylene (PTFE). By encapsulating the cushion, such as a foam rubber cushion, in a PTFE shell, the chair limits emission of particles by the cushion.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHAIR FOR USE IN A CLEAN ROOM ENVIRONMENT

FIELD OF THE INVENTION

The present invention relates generally to clean room technology and, more particularly, to chairs for use in a clean room environment.

BACKGROUND OF THE INVENTION

Virtually all semiconductor fabrication facilities include one or more clean rooms in which the total number of particles per unit volume is tightly controlled along with the temperature and the humidity. For example, a Class 100 clean room has a dust count of no more than 100 particles having diameters of 0.5 $\mu$m or larger per cubic foot. As known to those skilled in the art, semiconductor fabrication processes are performed in a clean room since airborne particles can settle on semiconductor wafers and/or lithographic masks and cause defects in the resulting semiconductor wafer or device. For example, a particle on a semiconductor surface can disrupt the single crystal growth of an epitaxial layer and can disadvantageously cause the formation of dislocations.

While significant measures are taken to limit the number of particles which enter a clean room, such as by requiring clean room personnel to wear various lab coats, hats, masks and/or bunny suits, the equipment, including the furniture, within a clean room unfortunately also tends to emit a number of particles. For example, chairs used in clean rooms oftentimes emit particles when clean room personnel alternately sit down and stand up.

Typically, the chairs that are used in clean rooms include a seat, a back rest, a base and, in some instances, arm rests. While the base could be formed by three or four legs, the base of the chairs typically utilized in clean rooms generally include a telescoping pedestal for supporting the seat and for adjusting the height of the chair. In addition, the base of the typical chair used in a clean room includes a number of arms which extend radially outward from the lower end of the pedestal as well as a number of wheels, castors or rollers on the end portions of respective ones of the radially extending arms. As such, clean room personnel can move, i.e., roll, about the clean room while seated in the chair.

Typically, the seat and the back rest of the chairs conventionally used in clean rooms are formed of vinyl or a hard, compressed rubber material. As a result of the alternate compression and expansion of the seat member and the back rest as clean room personnel sit down in the chair and stand up from the chair, respectively, the seat and the back rest generally emit particles into the clean room atmosphere. In addition, the telescopic height adjustment of the chair provided by the pedestal also generates a number of particles that are emitted into the clean room atmosphere. As with other particles that enter the clean room atmosphere, a certain percentage of the particles will eventually settle on the semiconductor wafer or the lithographic mask so as to create defects in the resulting semiconductor wafer or device.

SUMMARY OF THE INVENTION

The present invention therefore provides a chair specifically designed for use in a clean room environment which limits the emission of particles by the chair as clean room personnel alternately sit down and stand up. In particular, the chair includes a base and a seat member operably mounted upon the base. The seat member, in turn, includes a cushion and a shell encapsulating the cushion. According to the present invention, the shell is comprised of polytetrafluoroethylene (PTFE), such as GORTEX® PTFE. By encapsulating the cushion, such as a foam rubber cushion, in a PTFE shell, the chair of the present invention limits emission of particles by the cushion.

In one advantageous embodiment, the base of the chair includes a telescoping pedestal for adjusting the height of the chair. As such, the pedestal can also be covered with a PTFE sleeve so as to similarly limit emission of particles upon adjustment of the height of the chair. By limiting the emission of particles into the atmosphere of the clean room, the chair of the present invention facilitates the fabrication of semiconductor wafers and semiconductor devices by further limiting the exposure of the semiconductor wafers and devices and the lithographic masks to undesired particles.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
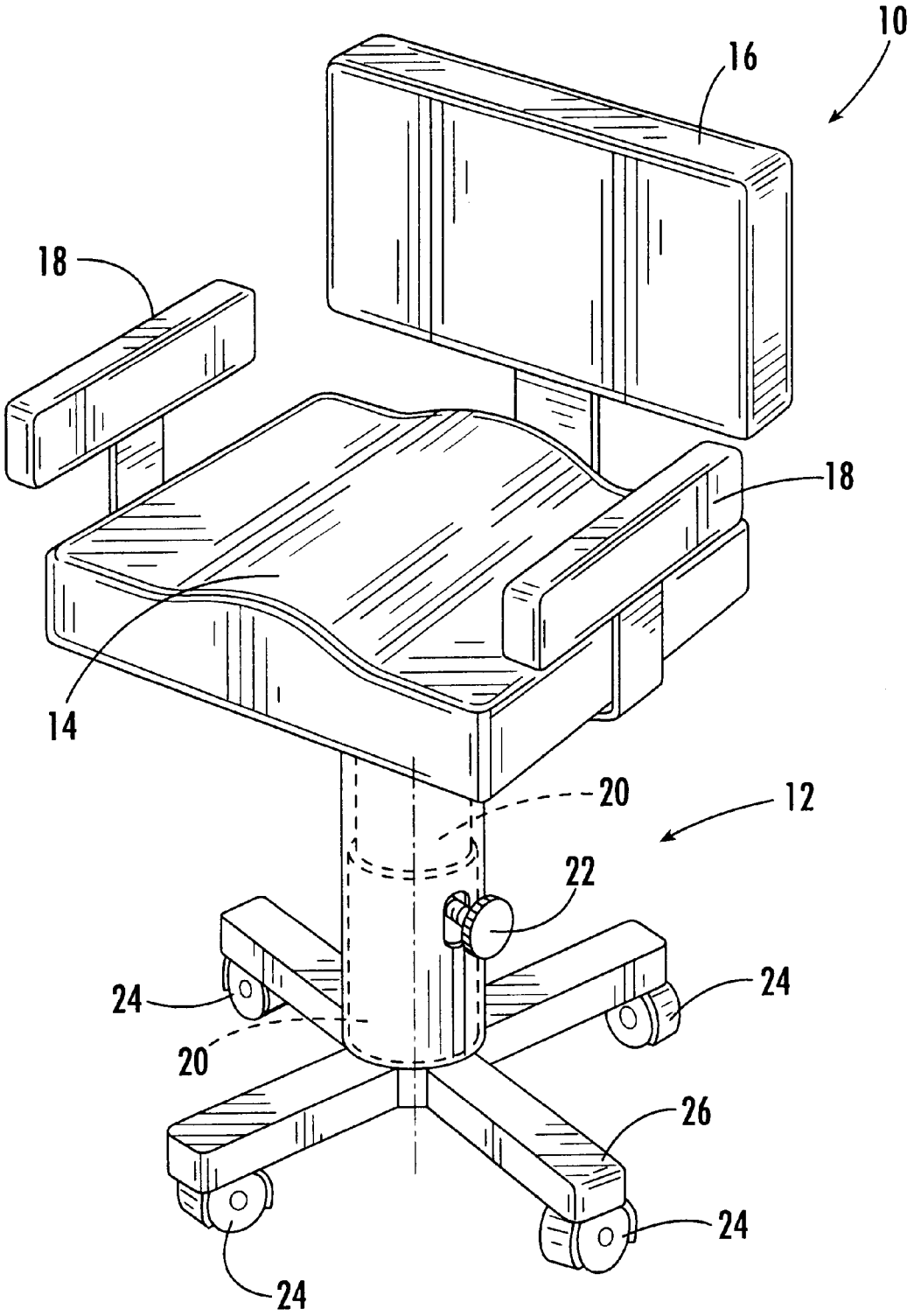
FIG. 1 is a perspective view of a chair according to one embodiment of the present invention.

Referring now to FIG. 1, a portion of a clean room including a chair 10 is illustrated. Although a variety of activities could be conducted in the clean room, the clean room is typically utilized for the fabrication of semiconductor wafers and semiconductor devices. As such, the number of particles within the clean room must be precisely controlled.

The chair 10 generally includes a base 12 and a seat member 14 mounted upon the base for supporting clean room personnel. In the illustrated embodiment, the chair also includes a back rest 16 and a pair of arm rests 18 so as to have the overall appearance of a conventional office chair. However, the chair of the present invention need not include a back rest and/or arm rests and can, instead, have the general appearance of a stool, if so desired.

As shown in FIG. 1, the chair 10 of one advantageous embodiment includes a base 12 having a telescoping pedestal 20. Although the base can be formed of a variety of materials, the base is preferably formed of anodized aluminum or is plated with chrome or nickel. As illustrated, the seat member 14 is operably mounted to the upper end of the pedestal. The telescoping pedestal of this embodiment is comprised of at least two partially nested sections and a height selection member 22. As known to those skilled in the art, the various sections of the pedestal are adapted to be telescopically extended and retracted so as to raise and lower the chair, respectively. The height selection member, such as a threaded post or the like, has an engaged position and a nonengaged position. In the engaged position, the height selection member engages the various sections of the pedestal so as to fix the relative positions of the various sections of the pedestal. In contrast, in the nonengaged position, the height selection member permits relative movement of the various sections of the pedestal. As such, clean room personnel can adjust the height of the chair as desired.

The base 12 of the chair 10 of the illustrated embodiment also includes a plurality of casters, rollers, wheels or the like 24 for facilitating movement of the chair within the clean room. In addition, the base of the chair of the illustrated embodiment includes a number of arms 26 extending radially outward from a lower end of the pedestal to a respective caster as known to those skilled in the art. While the base of the illustrated embodiment includes a telescoping pedestal, a number of radially extending arms attached to a lower end of the pedestal and a number of casters, the chair can include a variety of other bases without departing from the spirit and scope of the present invention. For example, the base can include three, four or more legs extending downwardly from the seat member, if so desired.

Figure 2:
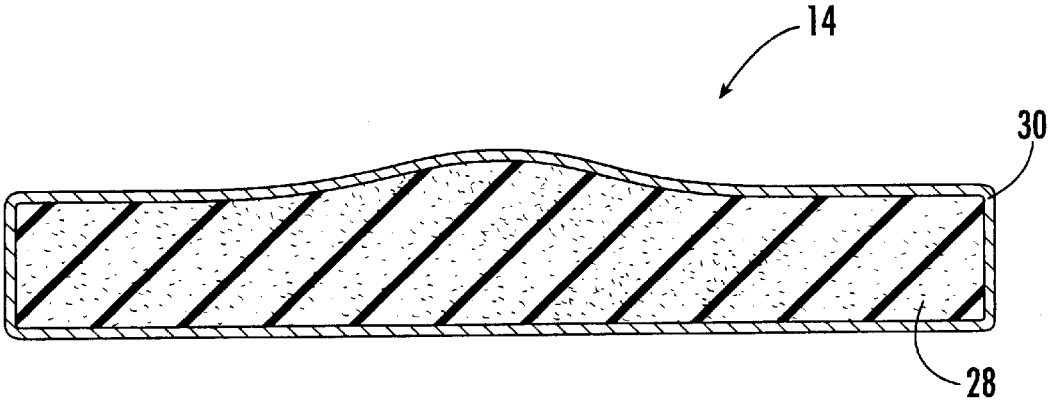
FIG. 2 is a cross-sectional view of the seat member of the chair of FIG. 1 illustrating the cushion and the PTFE shell which encapsulates the cushion.

As best illustrated in cross section in FIG. 2, the seat member 14 includes a cushion 28, typically formed of foam rubber, and a shell 30 encapsulating the cushion. According to the present invention, the shell is comprised of polytetrafluoroethylene (PTFE), such as GORTEX® PTFE supplied by W. L. Gore & Associates, Inc., to limit emission of particles by the cushion. Although applicant does not wish to be bound by any particular theory of operation, it is believed that the relatively small pore size of the PTFE shell limits the emission of particles by the cushion, particularly the emission of particles having a relatively large diameter. In addition, although the shell can be of various thicknesses, the shell of one advantageous embodiment has a thickness of 100 microns.

The shell 30 and the cushion 28 are preferably mechanically attached to each other and to the base 12. For example, the chair can include a circumferentially extending frame that overlies the shell and the cushion such that by securing the frame to an underlying support, the shell and the cushion are secured to one another and to the underlying support. The support, in turn, can be connected to the base.

Figure 3:
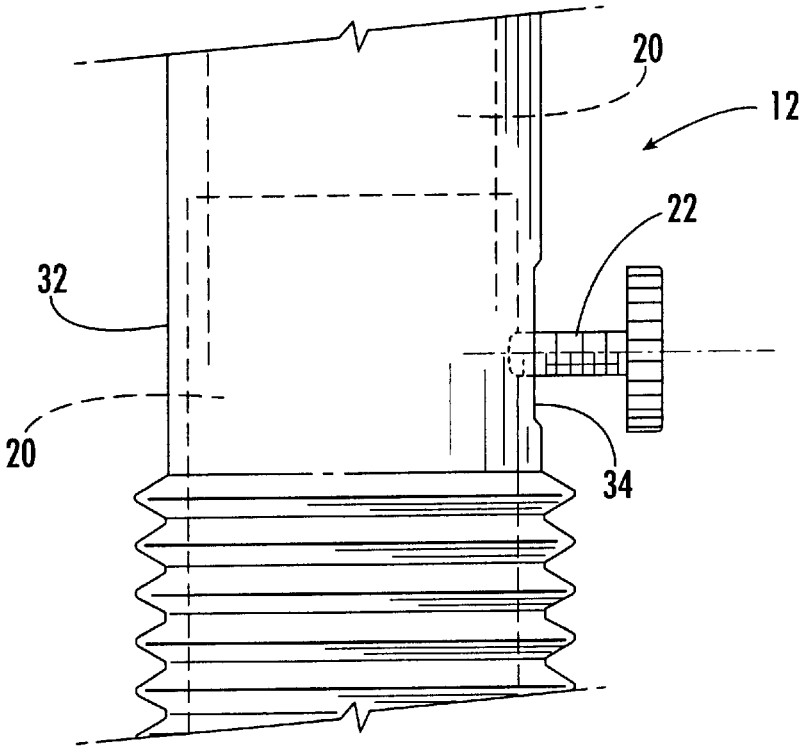
FIG. 3 is a fragmentary plan view of a portion of the pedestal of the chair of FIG. 1 in which the pedestal is covered with a PTFE sleeve.

Although not separately illustrated, the back rest 16 and the arm rests 18 of a chair 10 according to the present invention can also include an outer shell 30 of PTFE to similarly limit emission of particles by the cushioning material which form the back rest and the arm rests. As shown in FIG. 3, the base 12 and, more particularly, the telescoping pedestal 20 can also be covered with a PTFE sleeve 32 to limit emission of particles as the various sections of the telescoping pedestal are extended and retracted. As illustrated, the PTFE sleeve would preferably define a slit 34 in which the height selection member 22 travels as the chair is raised and lowered. The PTFE sleeve is preferably designed to fit the pedestal in its fully extended position. As such, in all instances in which the telescoping pedestal is not fully extended, such as shown in FIG. 3, the excess portion of the PTFE sleeve will generally accumulate in an accordion style about lower portions of the pedestal.

By limiting emission of particles, the chair 10 of the present invention is particularly well adapted for use in a clean room environment in which the number of particles of various sizes is strictly controlled. However, the chair of the present invention can be utilized in other applications if so desired.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A chair adapted for use in a clean room environment, the chair comprising:

a base; and a seat member operably mounted upon said base, said seat member comprising:

a cushion; and a shell encapsulating said cushion, said shell comprised of polytetrafluoroethylene to limit emission of particles by said cushion.

* * * * *